US012273676B2

(12) United States Patent
Yang et al.

(10) Patent No.: US 12,273,676 B2
(45) Date of Patent: Apr. 8, 2025

(54) RETRACTABLE HEADPHONE CONNECTION STRUCTURE AND HEAD-MOUNTED AUDIO DEVICE THEREWITH

(71) Applicant: DARFON ELECTRONICS CORP., Taoyuan (TW)

(72) Inventors: Chen Yang, Taoyuan (TW); Shao-Lun Hsiao, Taoyuan (TW); Hsiao-Han Chu, Taoyuan (TW)

(73) Assignee: DARFON ELECTRONICS CORP., Taoyuan (TW)

(*) Notice: Subject to any disclaimer, the term of this patent is extended or adjusted under 35 U.S.C. 154(b) by 213 days.

(21) Appl. No.: 18/096,020

(22) Filed: Jan. 12, 2023

(65) Prior Publication Data

US 2023/0308799 A1 Sep. 28, 2023

(30) Foreign Application Priority Data

Mar. 24, 2022 (TW) ................................ 111110983

(51) Int. Cl.
*H04R 1/10* (2006.01)

(52) U.S. Cl.
CPC ........... *H04R 1/105* (2013.01); *H04R 1/1008* (2013.01)

(58) Field of Classification Search
CPC ........ H04R 1/105; H04R 1/1008; H04R 1/10; H04R 1/1066; H04R 5/0335; H04R 2205/022; H04R 2201/10
USPC ................ 381/384, 376, 378, 379, 370, 374
See application file for complete search history.

(56) References Cited

U.S. PATENT DOCUMENTS

2018/0234532 A1* 8/2018 Meyberg ................ H04M 1/05
2022/0014837 A1* 1/2022 Kikuchi .............. H04R 1/1091

FOREIGN PATENT DOCUMENTS

CN 207266238 U 4/2018
CN 207766490 U 8/2018
CN 111405410 A * 7/2020 .............. H04R 1/02
CN 213280056 U 5/2021
CN 214756860 U 11/2021

* cited by examiner

*Primary Examiner* — Ahmad F. Matar
*Assistant Examiner* — Sabrina Diaz
(74) *Attorney, Agent, or Firm* — Winston Hsu

(57) ABSTRACT

A retractable headphone connection structure includes two connection supports which are slidably connected with each other in a sliding connection direction. One of the connection supports has a plurality of first magnetically attractive portions arranged at intervals along the sliding connection direction. The other of the connection supports has a second magnetically attractive portion. Therein, the two supports relatively slide to make the second magnetically attractive portion slide over the plurality of first magnetically attractive portions to generate a magnetic attraction force between the second magnetically attractive portion and one of the first magnetically attractive portions that is opposite to the second magnetically attractive portion. The magnetic attraction force positions the first connection support and the second connection support. A head-mounted audio device includes a headphone and the above retractable headphone connection structure. The headphone is disposed on one of the connection supports.

2 Claims, 8 Drawing Sheets

RETRACTABLE HEADPHONE CONNECTION STRUCTURE AND HEAD-MOUNTED AUDIO DEVICE THEREWITH

BACKGROUND OF THE INVENTION

1. Field of the Invention

The present invention relates to a head-mounted audio device, and more particularly to a head-mounted audio device with adjustable supports and a retractable headphone connection structure thereof.

2. Description of the Prior Art

Traditional headphones with adjustable supports usually achieve the adjustment function by adjusting the relative positions of two supports that are slidably connected to each other, so as to adapt to different user's head shapes. The mutual positioning of the supports can be realized through the friction force between the supports, and can also be realized through the arrangement of an elastic hook and recesses for the elastic hook to snap into on the supports. In the latter, the elastic hook can be made of metal or plastic, and the recesses can also be made of metal or plastic. Whether the adjustment function is realized through the positioning mechanisms based on friction force or structural clamping, these positioning mechanisms are all based on the mutual interference of physical structures. When adjusting the supports, in principle, wear will occur between the supports or the positioning structures (including the above elastic hook and recesses). Therefore, after multiple adjustments, the positioning ability of the positioning mechanism will be greatly reduced in principle, or even fail. Furthermore, when the positioning ability of the positioning mechanism declines, the tactile feedback of adjusting supports will also be reduced, which may easily cause troubles in the adjustment operation of the user.

SUMMARY OF THE INVENTION

An objective of the invention is to provide a retractable headphone connection structure, which uses magnetic attraction force to position supports.

A retractable headphone connection structure according to the invention includes a first connection support and a second connection support. The first connection support has a plurality of first magnetically attractive portions arranged at intervals in a slidably connecting direction. The second connection support is slidably connected to the first connection direction in the sliding connection direction and has a second magnetically attractive portion. Therein, the first connection support and the second connection support relatively slide to make the second magnetically attractive portion slide over the plurality of first magnetically attractive portions to generate a magnetic attraction force between the second magnetically attractive portion and one of the first magnetically attractive portions that is opposite to the second magnetically attractive portion. The magnetic attraction force positions the first connection support and the second connection support. Thereby, the positioning effect of the magnetic attraction force can be implemented without structural interference, so that in the process of adjusting the retractable headphone connection structure, structural wear can be avoided or greatly reduced, thereby effectively solving the problem in the prior art.

Another objective of the invention is to provide a head-mounted audio device, which has adjustable supports and uses magnetic attraction force to position the supports.

A head-mounted audio device according to the invention includes a headphone and the above retractable headphone connection structure. The headphone is disposed on the first connection support or the second connection support. By adjusting the relative position between the first connection support and the second connection support, the head-mounted audio device can adapt to different user's head shapes. Similarly, the positioning effect of the magnetic attraction force can be implemented without structural interference, so that in the process of adjusting the retractable headphone connection structure, structural wear can be avoided or greatly reduced, thereby effectively solving the problem in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
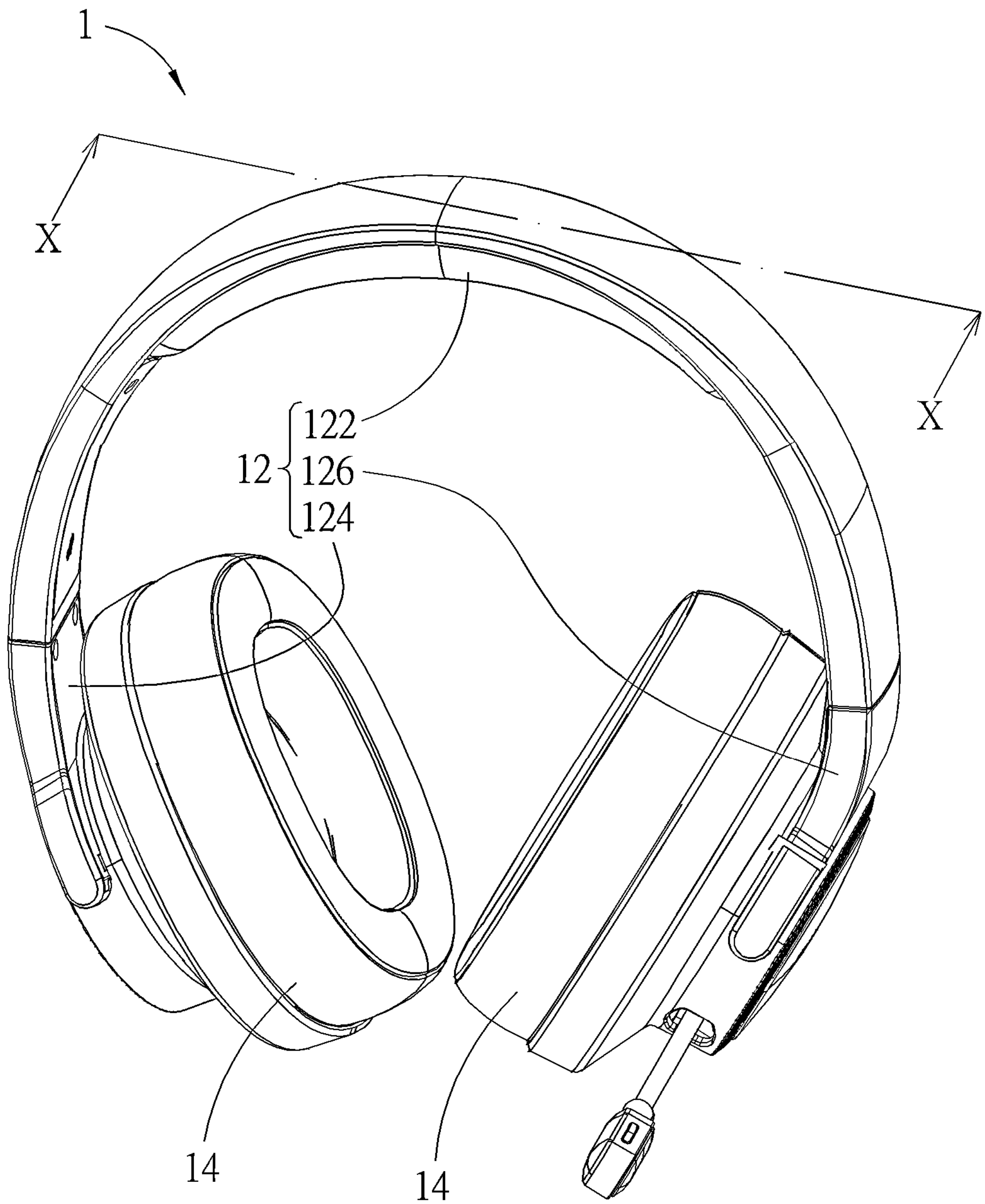
FIG. 1 is a schematic diagram illustrating a head-mounted audio device of a first embodiment according to the invention.

Please refer to FIG. 1. A head-mounted audio device 1 of a first embodiment according to the invention includes a retractable headphone connection structure 12 and two headphones 14. The headphones 14 are disposed on two sides of the retractable headphone connection structure 12. Utilizing the stretchable feature of the retractable headphone connection structure 12, the distance between the two headphones 14 along the retractable headphone connection structure 12 can be adjusted to adapt to different user's head shapes for easy wearing. Furthermore, please also refer to FIG. 2; therein, for drawing simplification, the headphone 14 is shown in a single solid object. The retractable headphone connection structure 12 includes a first connection support 122 and a second connection support 124. The first connection support 122 and the second connection support 124 are slidably connected to each other along a slidably connecting direction D1 (indicated by a two-headed arrow in the figure). One of the headphones 14 is disposed on the second connection support 124. The structural retractable feature of the retractable headphone connection structure 12 can be achieved by relatively sliding the first connection support 122 and the second connection support 124.

In the first embodiment, the first connection support 122 includes a first support body 1222 and a plurality of first magnetically attractive portions 1224 disposed on the first support body 1222. The plurality of first magnetically attractive portion 1224*s* are arranged at intervals in a slidably connecting direction D1. The second connection support 124 includes a second support body 1242 and a second magnetically attractive portion 1244 on the second support body 1242. When the first connection support 122 and the second connection support 124 relatively slide along the slidably connecting direction D1, the second magnetically attractive portion 1244 will slide over the plurality of first magnetically attractive portions 1224. The first magnetically attractive portions 1224 and the second magnetically attractive portion 1244 can generate magnetic attraction force therebetween. Thereby, by relatively sliding the first connection support 122 and the second connection supports 124, the second magnetically attractive portion 1244 can slide over the plurality of first magnetically attractive portions 1224 and a magnetic attraction force is generated between the second magnetically attractive portion 1244 and one of the first magnetically attractive portions 1224 that is opposite to the second magnetically attractive portion 1244. The magnetic attraction force can position the first connection support 122 and the second connection support 124. On the other hand, when the second magnetically attractive portion 1244 deviates from the opposite first magnetically attractive portion 1224, the magnetic attraction force will decrease; that is, in principle, when the second magnetically attractive portion 1244 is facing one of the first magnetically attractive portions 1224, the magnetic attraction force reaches a relatively maximum value. Therefore, when the user stretches or shortens the retractable headphone connection structure 12 so that the second magnetically attractive portion 1244 slides over the plurality of first magnetically attractive portions 1224, the magnetic attraction force between the second magnetically attractive portion 1244 and the plurality of first magnetically attractive portions 1224 will change, so that the user can feel tactile feedback, which is convenient for the user to adjust the relative position between the first connection support 122 and the second connection support 124. For example, FIG. 3 shows that the retractable headphone connection structure 12 is stretched.

Figure 2:
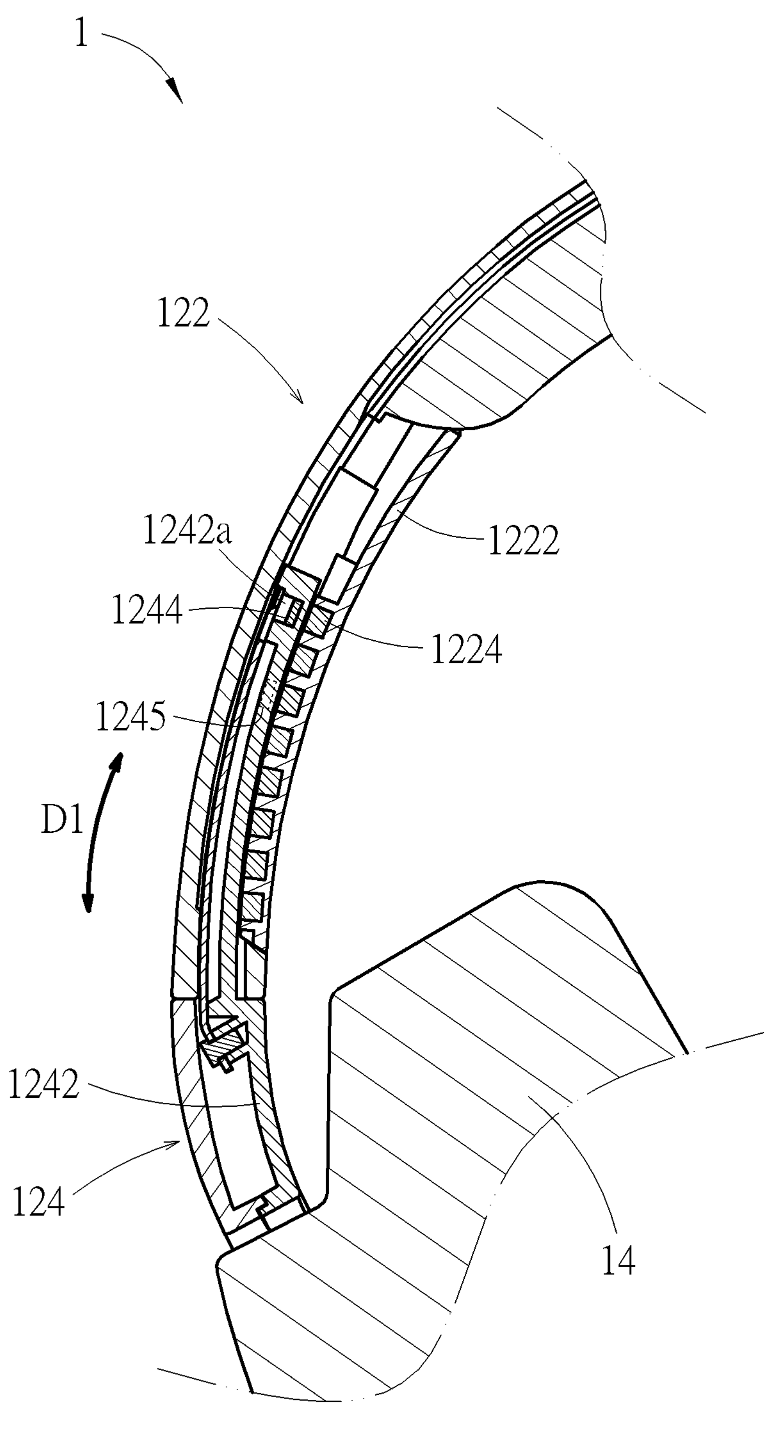
FIG. 2 is a sectional view of a portion of the head-mounted audio device along the line X-X in FIG. 1.
Figure 3:
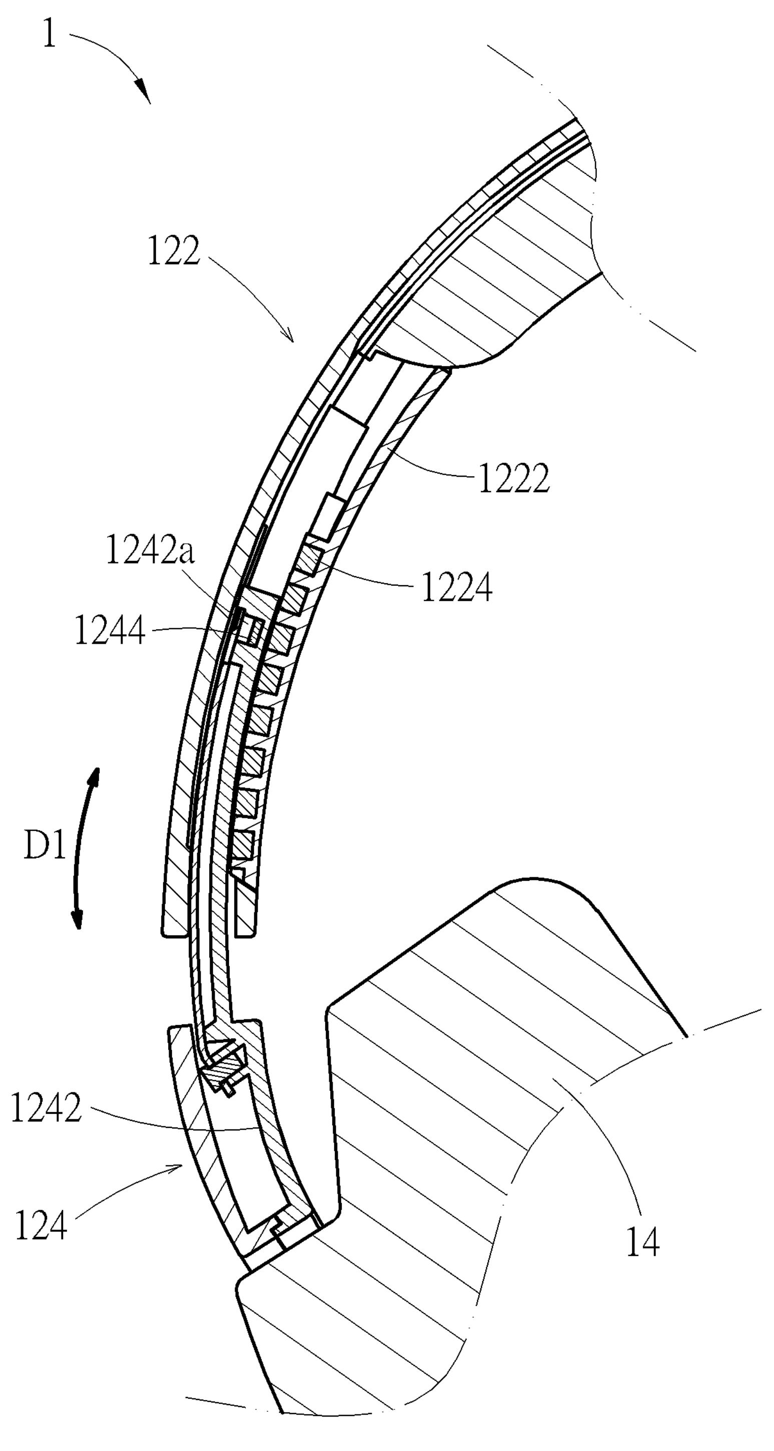
FIG. 3 is a schematic diagram illustrating the head-mounted audio device in FIG. 2 whose retractable headphone connection structure is stretched.

Please refer to FIG. 2 and FIG. 3. In practice, the first magnetically attractive portion 1224 and the second magnetically attractive portion 1244 respectively may include at least one magnet (such as a single magnet or a plurality of magnets stacked). The opposite magnetic poles of the first magnetically attractive portion 1224 and the second magnetically attractive portion 1244 are opposite in polarity. Furthermore, in practice, it is practicable that one of the first magnetically attractive portion 1224 and the second magnetically attractive portion 1244 include at least one magnet (such as a single magnet or a plurality of magnets stacked) while the other one includes a ferromagnetic magnet (such as an iron part). A magnetic attraction force can also be generated between the first magnetically attractive portion 1224 and the second magnetically attractive portion 1244, thereby achieving the positioning between the first connection support 122 and the second connection support 124.

Figure 4:
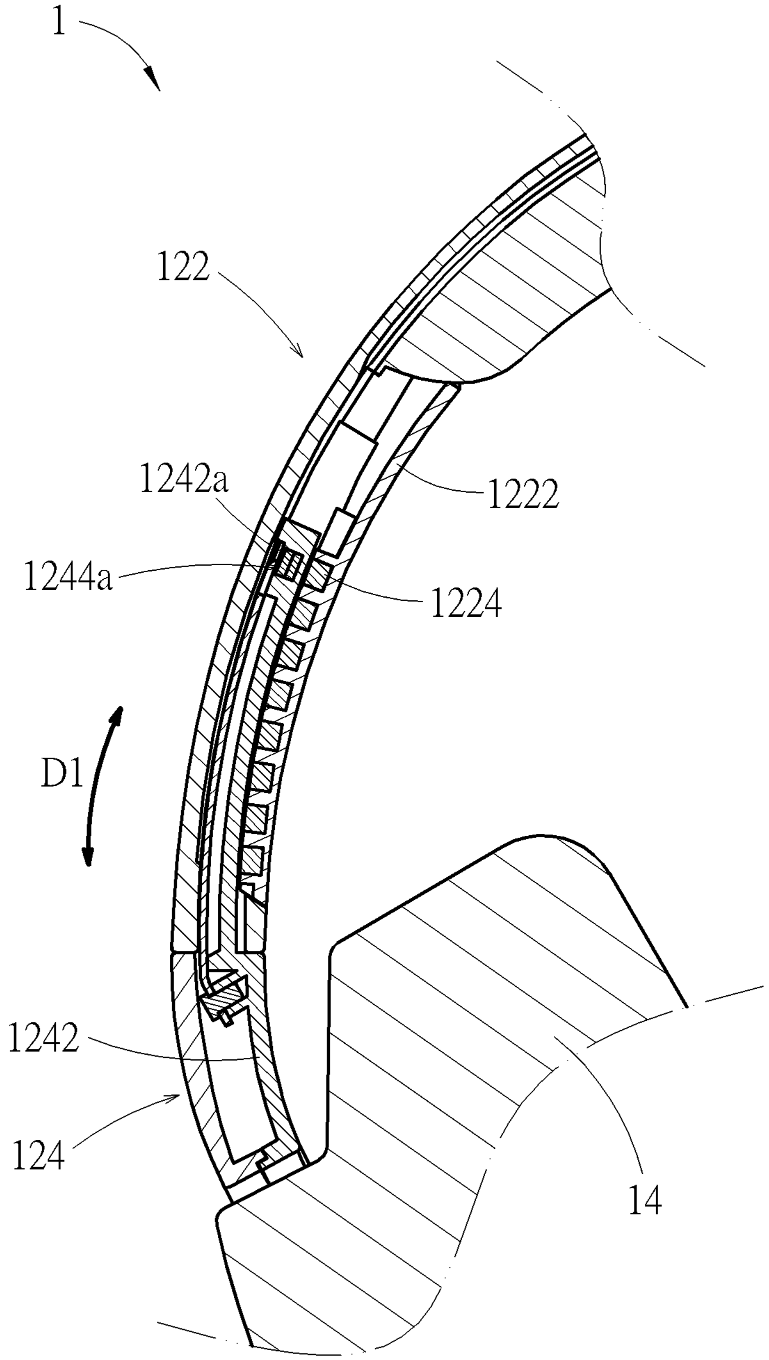
FIG. 4 is a schematic diagram illustrating the head-mounted audio device in FIG. 2 whose second magnetically attractive portion are realized by multiple magnets.
Figure 5:
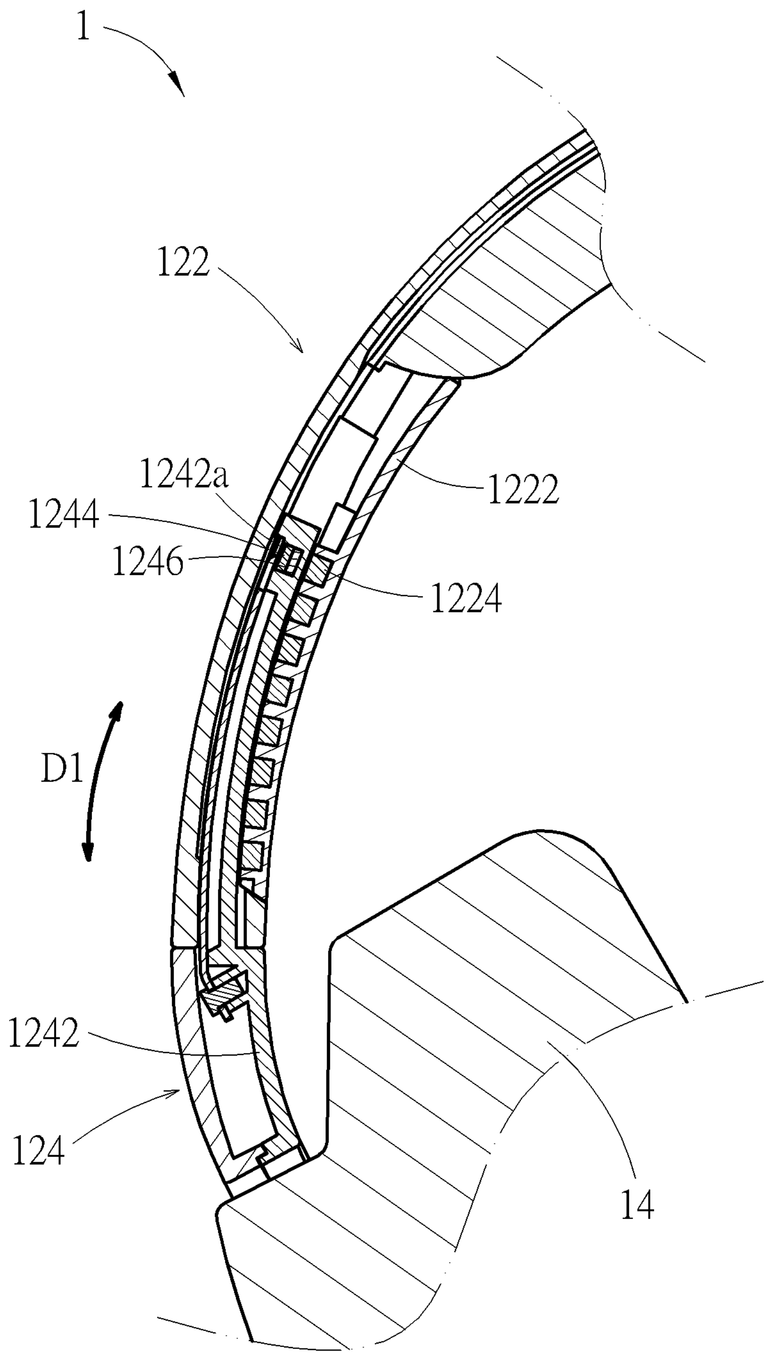
FIG. 5 is a schematic diagram illustrating the head-mounted audio device in FIG. 2 whose second magnetically attractive portion is changed in position by a removable spacer.

Furthermore, in FIG. 2 and FIG. 3, the magnitude design of the magnetic attraction force generated between the second magnetically attractive portion 1244 and the opposite first magnetically attractive portion 1224 can be realized by changing the magnetic field strength of the magnet itself (for example, the first magnetically attractive portion 1224 or the second magnetically attractive portion 1244 is replaced with a different magnet), by changing the number of magnets (for example, the first magnetically attractive portion 1224 or the second magnetically attractive portion 1244 is implemented with more or less magnets; for example, the second magnetically attractive portion 1244*a* in FIG. 4 includes a plurality of magnets which are not limited to be the same in practice), or by changing the distance between the second magnetically attractive portion 1244 and the opposite first magnetically attractive portion 1224 (i.e., the distance in a direction perpendicular to the slidably connecting direction D1). In the latter, for example, as shown by FIG. 5, the second support body 1242 has a recess 1242*a*. The second magnetically attractive portion 1244 and a removable spacer 1246 are disposed in the recess 1242*a*. The removable spacer 1246 is non-magnetic and located between the second magnetically attractive portion 1244 and the bottom of the recess 1242*a*. Through the disposition of the removable spacer 1246, the disposition position of the second magnetically attractive portion 1244 in the recess 1242*a* can be changed, thereby changing the distance between the second magnetically attractive portion 1244 and the opposite first magnetically attractive portion 1224. Similarly, in FIG. 5, it is practicable in practice to dispose a plurality of removable spacers between the second magnetically attractive portion 1244 and the bottom of the recess 1242*a* for obtaining a required distance, in which these removable spacers are not limited to have the same thickness. For another example, the above recess 1242*a* may be replaced with a through threaded hole. A screw is screwed into the threaded hole. The second magnetically attractive portion 1244 is fixed on an end of the screw. By rotating the screw, the disposition position of the second magnetically attractive portion 1244 in the threaded hole can be changed, that is, the distance between the second magnetically attractive portion 1244 and the opposite first magnetically attractive portion 1224 can be changed.

In practice, the aforementioned multiple methods of changing the magnetic attraction force generated between the second magnetically attractive portion 1244 and the opposite first magnetically attractive portion 1224 can also be implemented in combination and can be implemented by the user (for example, by designing the structures of the first connection support 122 and the second connection support 124 to allow the user to perform the aforementioned operations for adjusting the magnetic attraction force, for example, the second connection support 124 is allowed to be pulled out from the first connection support 122 so that the user can directly move the second magnetically attractive portion 1244), which will not be described in addition. Furthermore, as shown by FIG. 2, in the first embodiment, the plurality of first magnetically attractive portions 1224 are arranged at equal intervals in the slidably connecting direction D1, but it is not limited thereto in practice. In addition, in practice, the second connection support 124 may further include another second magnetically attractive portion 1245 (shown by a dashed rectangle in FIG. 2). The distance between the second magnetically attractive portions 1244 and 1245 in the slidably connecting direction D1 is a multiple of the arrangement spacing of the plurality of first magnetically attractive portions 1224 in the slidably connecting direction D1, so that when the second magnetically attractive portion 1244 is aligned with one of the first magnetically attractive portions 1224, the second magnetically attractive portion 1245 will be aligned with another of the first magnetically attractive portions 1224 in principle. A magnetic attraction force between the second magnetically attractive portion 1245 and the opposite first magnetically attractive portion 1224 will also be generated. This magnetic attraction force is also conducive to the positioning between the first connection support 122 and the second connection support 124.

Furthermore, in the first embodiment, the first connection support 122 is located at the overall headband of the head-mounted audio device 1 (when the user wears the head-mounted audio device 1, the headband will span the top of the head), and the headphone 14 is located on the second connection support 124. In practice, through structural design, the plurality of first magnetically attractive portions may be disposed on the support connected with the headphone, and the second magnetically attractive portion is disposed on another support slidably connected with the above support. In structural logic, this configuration is equivalent to the first embodiment except that the first connecting frame 122 and the second connecting frame 124 are interchanged.

In addition, in the first embodiment, the retractable headphone connection structure 12 also includes a connection support 126 slidably connected to the first connection support 122, which also can achieve of the structural scalability of the retractable headphone connection structure 12. Another headphone 14 is disposed on the connection support 126. The positioning mechanism for the connection support 126 and the first connection support 122 can also be realized by, but not limited to, the positioning mechanism for the first connecting bracket 122 and the second connecting bracket 124, but it is not limited thereto in practice, e.g., by a positioning mechanism using friction or other known positioning mechanisms. In addition, the head-mounted audio device 1 is roughly symmetrical in structure, but it is not limited thereto in practice. For example, the first connection support 122 and the connection support 126 are realized by the same support, so that the positioning of the retractable headphone connection structure is realized only by the positioning mechanism for the first connection support 122 and the second connection support 124 in principle.

Figure 6:
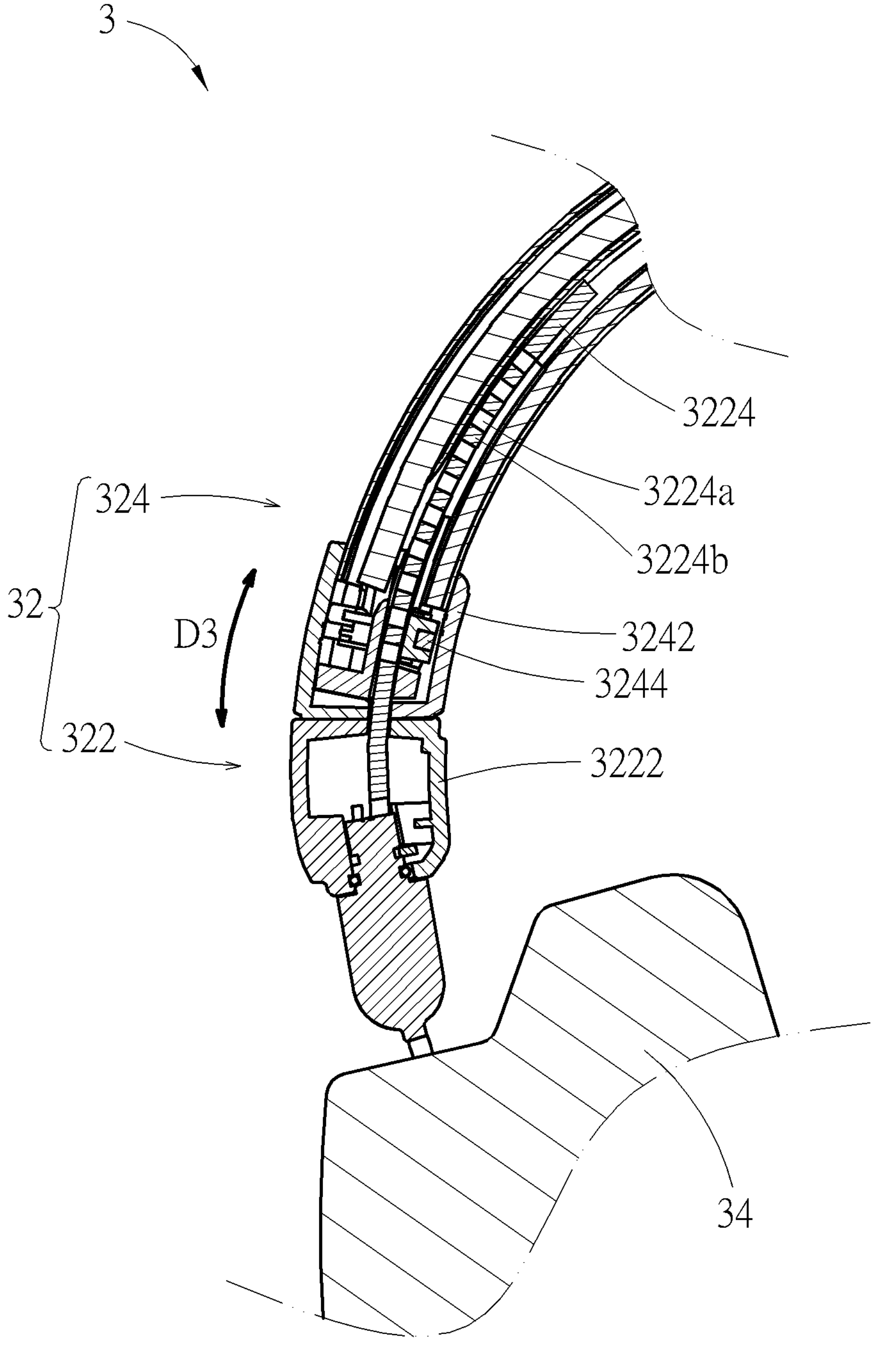
FIG. 6 is a sectional view of a portion of a head-mounted audio device of a second embodiment according to the invention.
Figure 7:
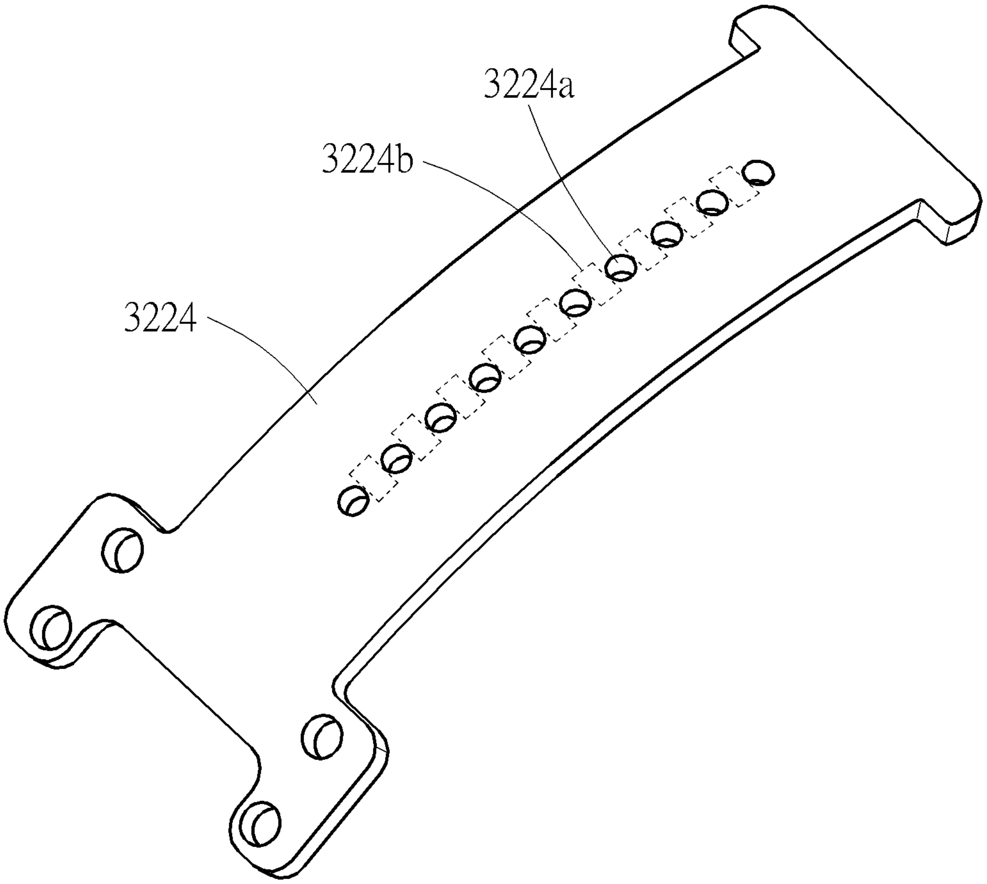
FIG. 7 is a schematic diagram illustrating a sheet of ferromagnetic material of a first connection support in FIG. 6.

Please refer to FIG. 6, in which the position of the cutting plane is equivalent to the line X-X in FIG. 1. A head-mounted audio device 3 of a second embodiment according to the invention is roughly the same in structure as the head-mounted audio device 1 of the first embodiment. A main difference between them is that the positioning mechanisms are different. For the appearance of the head-mounted audio device 3, please refer to the head-mounted audio device 1 in FIG. 1. In the second embodiment, the head-mounted audio device 3 includes a retractable headphone connection structure 32 and two headphones 34 (one of them is not shown in the figure, and the other one is shown in a single solid object for drawing simplification). The headphones 34 are disposed at two opposite sides of the retractable headphone connection structure 32. By using the stretchable feature of the retractable headphone connection structure 32, the distance between the two headphones 34 along the retractable headphone connection structure 32 can be adjusted to suit different user's head shapes, thereby facilitating wearing. Please also refer to FIG. 7 and FIG. 8. The retractable headphone connection structure 32 includes a first connection support 322 and a second connection support 324. The first connection support 322 and the second connection support 324 are slidably connected in a slidably connecting direction D3 (indicated by a two-headed arrow in the figures). One of the headphones 34 is disposed on the first connection support 322. The structural retractable feature of the retractable headphone connection structure 32 can be achieved by relatively sliding the first connection support 322 and the second connection support 324.

In the second embodiment, the first connection support 322 includes a first support body 3222 and a sheet of ferromagnetic material 3224 disposed on the first support body 3222. The sheet of ferromagnetic material 3224 extends in the slidably connecting direction D3 and has a plurality of holes 3224*a* (for example, but not limited to, round holes, or notches). The sheet of ferromagnetic material 3224 thereon defines a plurality of first magnetically attractive portions 3224*b* (indicated by dashed rectangles in FIG. 7) in the slidably connecting direction D3. The plurality of holes 3224*a* and the plurality of first magnetically attractive portions 3224*b* are staggered in the slidably connecting direction D3; in other words, the plurality of first magnetically attractive portions 3224*b* are arranged at intervals in the slidably connecting direction D3. The second connection support 324 includes a second support body 3242 and a second magnetically attractive portion 3244 on the second support body 3242. When the first connection support 322 and the second connection support 324 relatively slide in the slidably connecting direction D3, the second magnetically attractive portion 3244 will slide over the plurality of first magnetically attractive portions 3224. The first magnetically attractive portions 3224 and the second magnetically attractive portion 3244 can generate magnetic attraction force therebetween.

Figure 8:
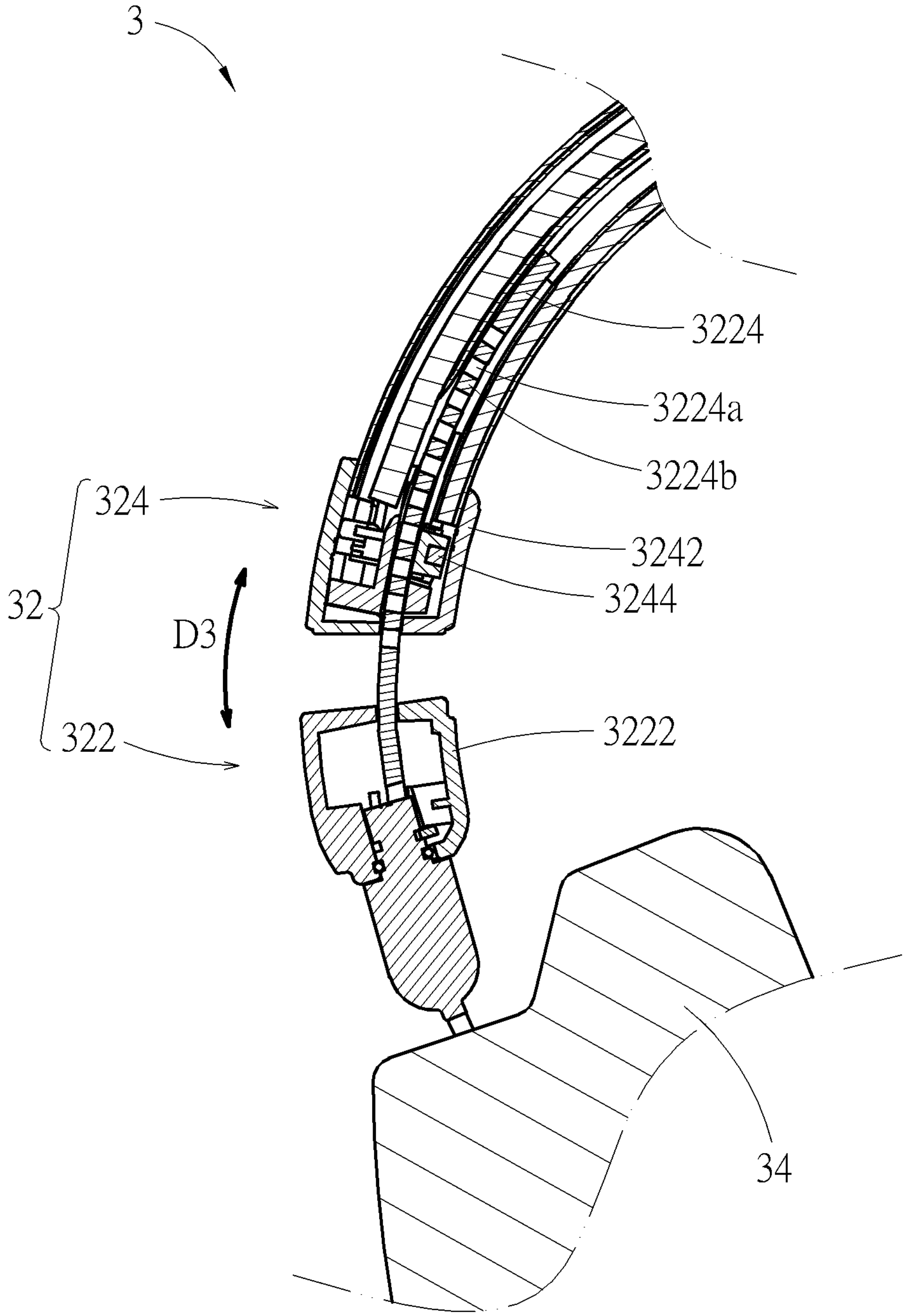
FIG. 8 is a schematic diagram illustrating the head-mounted audio device in FIG. 6 whose retractable headphone connection structure is stretched.

Thereby, by relatively sliding the first connection support 322 and the second connection supports 324, the second magnetically attractive portion 3244 can slide over the plurality of first magnetically attractive portions 3224 and a magnetic attraction force is generated between the second magnetically attractive portion 3244 and one of the first magnetically attractive portions 3224 that is opposite to the second magnetically attractive portion 3244. The magnetic attraction force can position the first connection support 322 and the second connection support 324. On the other hand, when the second magnetically attractive portion 3244 deviates from the opposite first magnetically attractive portion 3224*b*, the magnetic attraction force will decrease; that is, in principle, when the second magnetically attractive portion 3244 is facing one of the first magnetically attractive portions 3224, the magnetic attraction force reaches a relatively maximum value. Therefore, when the user stretches or shortens the retractable headphone connection structure 32 so that the second magnetically attractive portion 3244 slides over the plurality of first magnetically attractive portions 3224, the magnetic attraction force between the second magnetically attractive portion 3244 and the plurality of first magnetically attractive portions 3224 will change, so that the user can feel tactile feedback, which is convenient for the user to adjust the relative position between the first connection support 322 and the second connection support 324. For example, FIG. 8 shows that the retractable headphone connection structure 32 is stretched.

For other explanations about the head-mounted audio device 3 (such as the material, disposition position, disposition quantity, etc. of the first magnetically attractive portion 3224*b* and the second magnetically attractive portion 3244), please refer to the relevant descriptions of the head-mounted audio device 1 and its variations in the foregoing, which will not be described in addition.

As discussed above, in the head-mounted audio devices 1 and 3, the positioning of the retractable headphone connection structures 12 and 32 is realized by magnetic attraction force without structural interference. The elongation or shortening action of the retractable headphone connection structures 12 and 32 can also avoid introducing structural friction. Thereby, the retractable headphone connection structures 12 and 32 can avoid or significantly reduce structural wear during adjustment, thereby avoiding the problem that the general positioning mechanisms using friction or structural interference will produce structural wear after multiple telescopic adjustments, resulting in a sharp drop in positioning ability, or even failure. Furthermore, the retractable headphone connection structures 12 and 32 use the magnetic attraction force for positioning. In principle, the magnitude of the magnetic attraction force for positioning can remain unchanged even after multiple telescopic adjustments, which helps to maintain the tactile feedback for user when adjusting the retractable headphone connection structures 12 and 32, and which can also avoid the problem that the tactile feedback provided by the general positioning mechanisms using friction or structural interference will be weakened due to structural wear, which easily causes troubles for the user in the adjustment operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A retractable headphone connection structure, comprising:

a first connection support, the first connection support having a plurality of first magnetically attractive portions arranged at intervals in a slidably connecting direction; and a second connection support, the second connection support being slidably connected to the first connection direction in the sliding connection direction and having a second magnetically attractive portion;

wherein the first connection support and the second connection support relatively slide to make the second magnetically attractive portion slide over the plurality of first magnetically attractive portions to generate a magnetic attraction force between the second magnetically attractive portion and one of the first magnetically attractive portions that is opposite to the second magnetically attractive portion, and the magnetic attraction force positions the first connection support and the second connection support;

wherein the first magnetically attractive portion or the second magnetically attractive portion comprises at least one magnet, and a disposition position of the at least one magnet in a direction perpendicular to the slidably connecting direction is user-adjustable;

wherein the at least one magnet is fixed in a recess, a removable spacer is disposed between the at least one magnet and a bottom of the recess, to adjust a disposition position of the at least one magnet in the direction perpendicular to the slidably connecting direction, and the removable spacer is non-magnetic.

2. A head-mounted audio device, comprising:

a retractable headphone connection structure, the retractable headphone connection structure comprising a first connection support and a second connection support, the first connection support having a plurality of first magnetically attractive portions arranged at intervals in a slidably connecting direction, the second connection support being slidably connected to the first connection direction in the sliding connection direction and having a second magnetically attractive portion; and a headphone, the headphone being disposed on the first connection support or the second connection support;

wherein the first connection support and the second connection support relatively slide to make the second magnetically attractive portion slide over the plurality of first magnetically attractive portions to generate a magnetic attraction force between the second magnetically attractive portion and one of the first magnetically attractive portions that is opposite to the second magnetically attractive portion, and the magnetic attraction force positions the first connection support and the second connection support;

wherein the first magnetically attractive portion or the second magnetically attractive portion comprises at least one magnet, and a disposition position of the at least one magnet in a direction perpendicular to the slidably connecting direction is user-adjustable;

wherein the at least one magnet is fixed in a recess, a removable spacer is disposed between the at least one magnet and a bottom of the recess, to adjust a disposition position of the at least one magnet in the direction perpendicular to the slidably connecting direction, and the removable spacer is non-magnetic.

* * * * *